Patented July 15, 1969

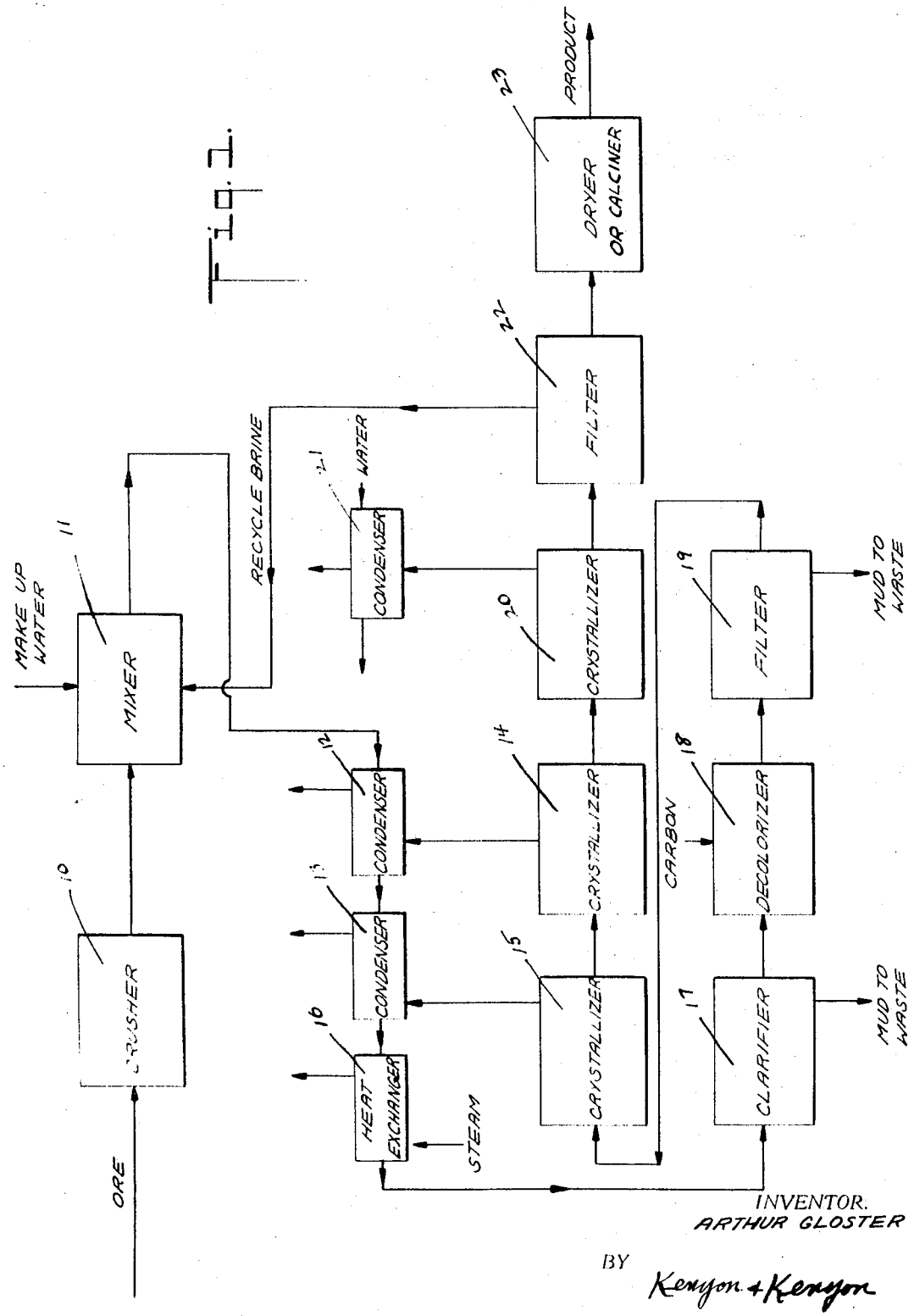

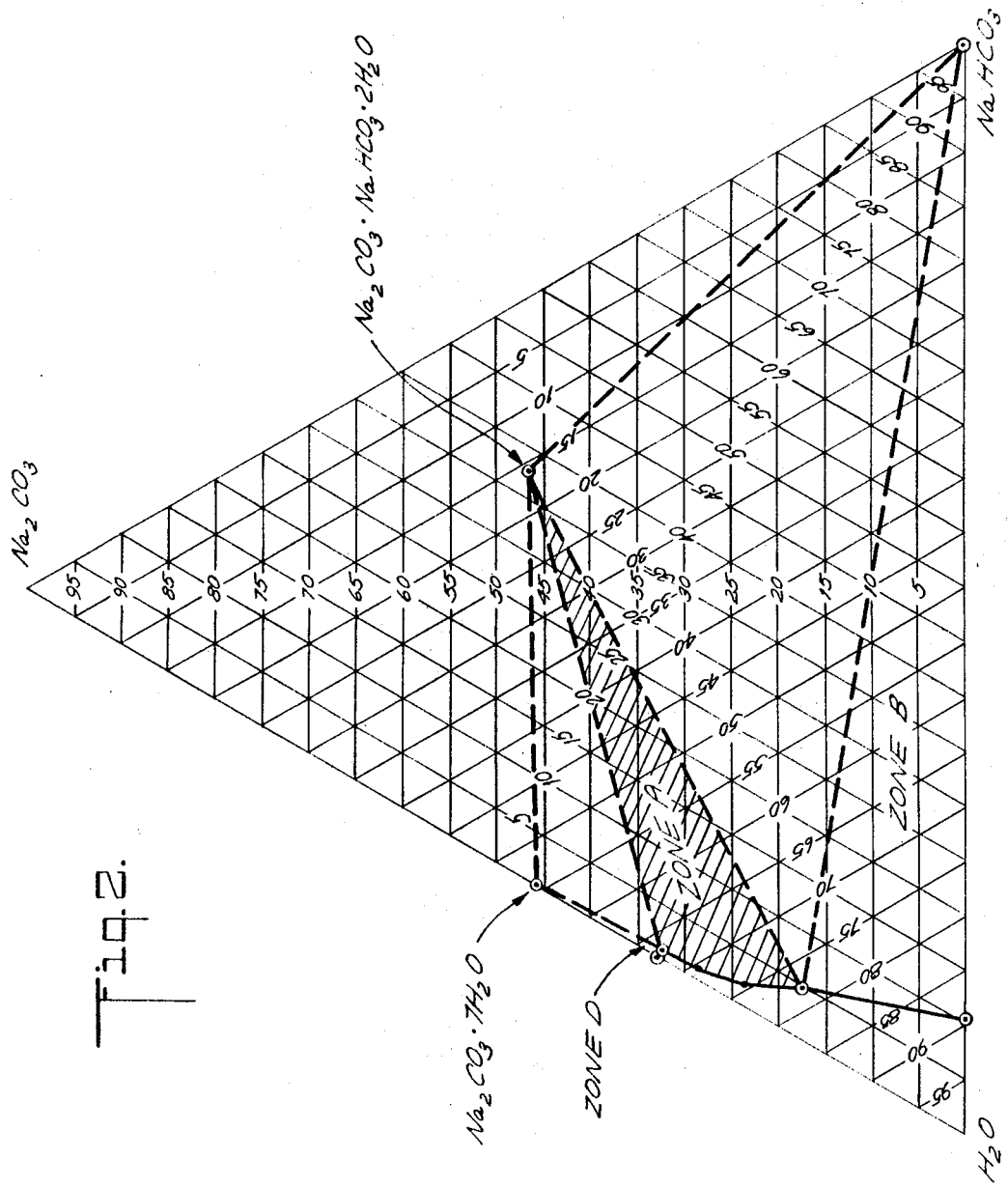

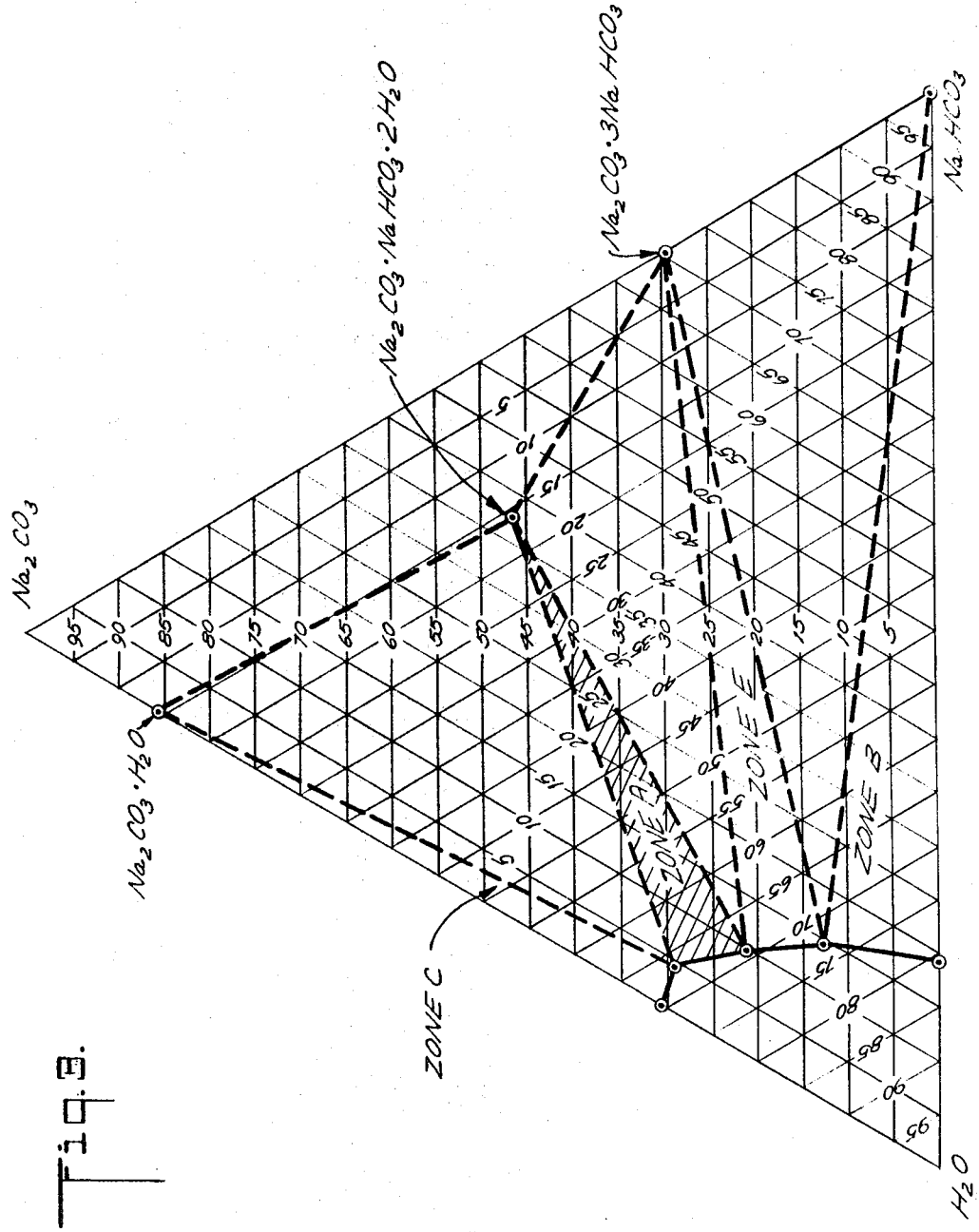

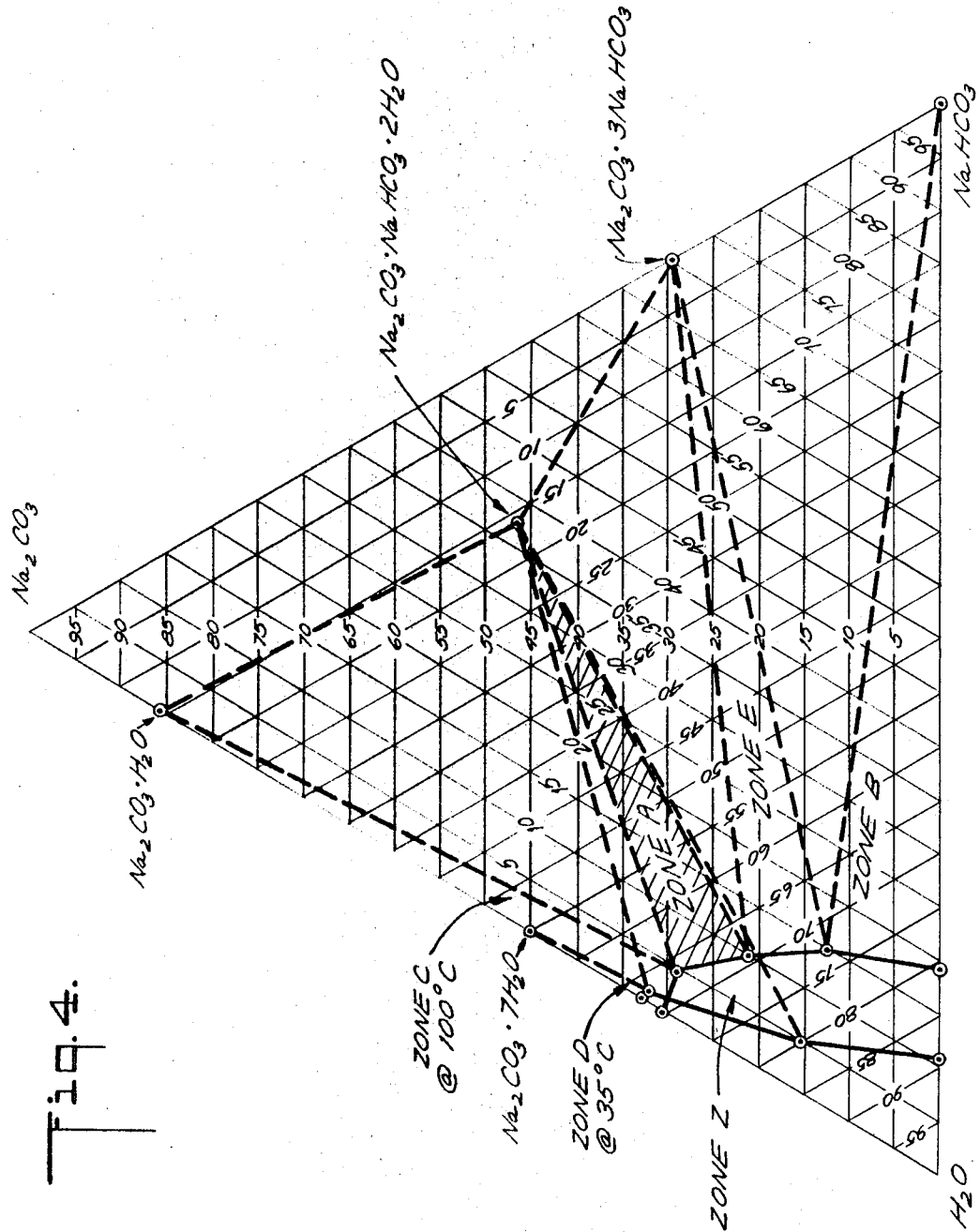

3,455,647
PROCESS FOR PRODUCING SODIUM SESQUICARBONATE AND SODA ASH FROM TRONA
Arthur Gloster, New York, N.Y., assignor to Texas Gulf Sulphur Company, New York, N.Y., a corporation of Texas
Filed May 25, 1967, Ser. No. 641,205
Int. Cl. C01d 7/00
U.S. Cl. 23—63                                              4 Claims

ABSTRACT OF THE DISCLOSURE

A process for producing sodium carbonate (soda ash) from trona ore (sodium sesquicarbonate) comprising the steps of forming a slurry of undissolved trona in recycled brine, heating the slurry in the condensers of the crystallizers, further heating the slurry to dissolve the trona, removing solids by filtration, crystallizing the trona from solution, filtering the crystals and then calcining them to form soda ash.

---

This invention relates to an improved process for producing sodium carbonate (soda ash) from its naturally occurring ore trona where it exists as sodium sesquicarbonate ($Na_2CO_3 \cdot NaHCO_3 \cdot 2H_2O$). The recovered sodium sesquicarbonate is calcined to form the soda ash in accordance with the following equation:

$$2(Na_2CO_3 \cdot NaHCO_3 \cdot 2H_2O) \rightarrow 3Na_2CO_3 + 5H_2O + CO_2$$

A major item of expense in the production of soda ash from trona is the expenditure for fuel. The process herein described utilizes a novel arrangement of the processing steps to purify the sodium sesquicarbonate and thereby reduce the expenditure for fuel. One novel feature of this process is the use of a slurry of undissolved trona in recycled brine to recover heat from the crystallizers and to reduce the requirement of new steam.

A principal object of the invention, therefore, is to provide a process for producing soda ash from trona having novel thermal efficiencies with increased economic advantages.

Another object is to provide improved techniques for obtaining commercially acceptable or pure soda ash from trona with a minimum of processing.

Briefly the process of the present invention involves crushing the trona ore to a predetermined size, mixing the crushed ore with recycled brine from the crystallizers to form a slurry wherein a major or predominant part of the trona present in the slurry is in the undissolved state, passing the slurry in countercurrent flow through the barometric condensers of the high stage crystallizers whereby the slurry is heated to dissolve at least part of the trona, further heating said slurry to dissolve the remainder of the trona present, removing the insoluble materials, soluble impurities and organic matter from the solution, crystallizing pure trona from the solution, then filtering the crystals and calcining them to form soda ash.

Other objects and features of the invention will become apparent in the following specification, and in the drawing in which FIG. 1 is a schematic flow sheet of a process incorporating the principal features of the invention, and FIGS. 2–4 are phase diagrams for the system $Na_2CO_3$, $NaHCO_3$ and $H_2O$ at various temperatures.

Referring now to the drawing the process can be explained as follows: Naturally occurring ore is fed to a conventional crusher 10 where it is reduced to an appropriate size (e.g. 10 to 50 mesh) and is then fed to mixer 11 which can be any suitable apparatus such as a rotary mixer, tank and stirrer, or the like, wherein the crushed ore is intimately mixed with recycle brine and makeup water added, if necessary, to form a slurry containing undissolved (and possibly some dissolved) trona, soluble impurities, insoluble impurities and organic matter.

The slurry is then passed sequentially preferably in countercurrent flow as shown, through barometric condensers 12 and 13 of crystallizers 14 and 15, respectively, where the condensing steam in the barometric condensers heats the slurry and in addition provides some additional water to the system, both of which aid in dissolution of the suspended undissolved trona. The slurry leaving the final barometric condenser 13 is then passed through a heat exchanger 16 where the slurry is further heated by steam (either by direct contact or indirect) to completely dissolve the sodium sesquicarbonate content of the trona.

Next the solution with its impurities is passed to clarifier stage 17 where the insoluble material is removed by settling, using conventional chemical agents as flocculents, precipitants, crystal modifiers, etc. as required. The resultant mud is sent to waste. Any suitable means of separation, including clarification and/or filtration, centrifuging, etc., can be used for this stage. Then the clear effluent from clarifier 17 goes to decolorizer 18 where it is treated with carbon for removal of organic matter. The decolorized solution then is filtered at 19 and successively passed to the plurality of crystallizer stages 15, 14 and 20 where sodium sesquicarbonate is crystallized out of solution. The final crystallizer stage 20 has a separate water condenser 21 not involved in the recycle brine preliminary heating system.

From the final crystallizer 20 the crystal slurry is filtered at 22 and then either dried or calcined at 23 to provide either the pure sesquicarbonate or sodium carbonate as desired. Brine is recycled from the filter 22 to mixer 11 as shown and it may also be found desirable to recycle some brine also from one or more of the crystallizer stages although the above described process is preferred.

The composition of the recycled brine is controlled by permitting it to lose some of its carbon dioxide content from the heated solution to maintain the composition within that portion of the phase diagram which will permit the crystallization of sodium sesquicarbonate without also precipitating sodium bicarbonate or sodium carbonate. Sodium sesquicarbonate is a compound which forms an incongruent solution. If it is dissolved in pure water, and a precipitate is caused to form by cooling the solution or by evaporating some of the water, the first crystals to precipitate will not be sodium sesquicarbonate but will be a mixture of sodium bicarbonate and sodium sesquicarbonate. By permitting a portion of the carbon dioxide to escape, the composition of the solution will have a higher ratio of sodium carbonate to sodium bicarbonate than the ratio of the corresponding compounds in trona. If the solution is kept within the proper range which is apparent to those familiar with the use of phase diagrams or phase data, the precipitate will be sodium sesquicarbonate.

FIG. 2 is a phase diagram for the system $Na_2CO_3$, $NaHCO_3$ and $H_2O$ at 35° C. Under equilibrium conditions, when the composition of the complex lies within the area on the $H_2O$ side of the solid curve, everything is in solution. When the composition of the complex lies to the right of the curve, one or more solid phases exist. Within Zone A, the solid phase is pure sodium sesquicarbonate; within Zone B, it is pure sodium bicarbonate and within Zone D, it is pure sodium carbonate, heptahydrate. If the composition of the complex falls between these zones, the solids will be a mixture of the compounds in the adjacent zones.

FIG. 3 gives similar data at 100° C. FIG. 4 shows data for 35° C. superimposed on that of 100° C. If sodium sesquicarbonate is dissolved in recycled brine at a temperature of 100° C., is clarified and cooled to 35° C., essentially pure sodium sesquicarbonate crystals can be produced only if the composition of the complex is limited to the area indicated as Zone Z. Because this lies on the sodium carbonate side of a line drawn between the sodium sesquicarbonate composition and water, the complex must have a ratio of $Na_2CO_3$ to $NaHCO_3$ greater than 1 in order to fall within Zone Z.

It is recommended that recycled brine be used to dissolve the trona in order to maintain the required carbon dioxide balance. Also, because the sodium sesquicarbonate is more soluble in hot solution than in cold solution, it is possible to effect heat economies by heating and cooling the recycled brine, separating the precipitated crystals and recycling the brine. In this manner it is not necessary to evaporate all of the water used to dissolve the trona but only that portion which is evaporated by applying a vacuum to cool the pregnant solution. In order to provide a temperature difference to permit the flow of heat, at least one stage of the crystallizers must include a condenser which does not use recycled brine as the condensing medium.

The use of a slurry in the barometric condensers has several advantages from a thermodynamic viewpoint. Solutions of sodium carbonate and sodium bicarbonate, in the range required to make use of my process, have a higher boiling point than water at the same absolute pressure. This is usually called "boiling point rise" and is greater for higher strength solutions. Consequently, when water is used as the condensing fluid in a barometric condenser, the temperature of the water leaving the condenser must be colder than the temperature of the boiling solution by a temperature difference at least as great as the boiling point difference or the steam vapor will not condense in the water. In practice an additional temperature difference is required to permit the condenser to function. This is dependent on equipment design.

The use of recycle liquor permits the temperature of the liquor leaving the barometric condenser to be nearer that of the boiling liquid because the recycle liquor, itself, has a boiling point higher than water. However, this recycle liquor is being diluted as it passes through the barometric condensers, and its boiling point rise is being reduced.

The use of slurry in the barometric condensers permits the recycle solution not only to maintain its original strength but to increase in strength because of the higher solubility in hot solution. This increases the boiling point rise and permits the slurry to more nearly approach the temperature of the boiling solution in the crystallizer.

The above describes one advantage of using a slurry of trona as condensing fluid in the barometric condensers.

In addition to this, the sensible heat required to raise the temperature of the undissolved solids may be recovered as well as the endothermic heat of solution of the trona which is dissolved.

While one embodiment of the invention has been shown and described herein, it is to be understood that certain changes or additions may be made by those skilled in the art without departing from the scope and spirit of the invention.

I claim:

1. A process for the production of sodium sesquicarbonate from its naturally occurring trona ore comprising mixing the ore as a slurry in recycle brine from the crystallizers, the recycle brine being maintained in carbon dioxide balance to permit subsequent crystallization of sodium sesquicarbonate, heating the slurry by using it as a condensing fluid in the barometric condensers of at least one stage of a series of crystallizers, further heating the slurry to the required temperature to effect solution of soluble portions of the ore, purifying the hot pregnant solution to remove soluble and insoluble impurities, then crystallizing sodium sesquicarbonate from said solution by evaporation of a portion of its water under vacuum, separating the resultant crystals of sodium sesquicarbonate from the mother liquor, and recycling the mother liquor to form a new slurry with incoming additional raw trona.

2. A process as described in claim 1 in which makeup water is added to the slurry before it is passed through the barometric condenser.

3. A process as described in claim 1 in which makeup water is first contacted with the waste stream of the removed said impurities to recover heat and sodium salts, and then added to the slurry before it is passed through the barometric condenser.

4. A process for the production of soda ash from trona which comprises the steps described in claim 1 followed by subsequent calcining of the crystals of sodium sesquicarbonate to produce soda ash.

References Cited

UNITED STATES PATENTS

| 2,639,217 | 5/1953 | Pike | 23—63 |
| 3,028,215 | 4/1962 | Frint | 23—63 |
| 3,189,408 | 6/1965 | Miller | 23—63 |
| 3,246,962 | 4/1966 | Miller | 23—63 X |

OSCAR R. VERTIZ, Primary Examiner

G. T. OZAKI, Assistant Examiner

U.S. Cl. X.R.

23—31, 312